US005760385A

United States Patent [19]
Curry et al.

[11] Patent Number: 5,760,385
[45] Date of Patent: Jun. 2, 1998

[54] TRANSACTION SYSTEM AND METHOD

[75] Inventors: Stephen M. Curry; Michael L. Bolan, both of Dallas, Tex.

[73] Assignee: Dallas Semiconductor Corporation, Dallas, Tex.

[21] Appl. No.: 757,352

[22] Filed: Nov. 27, 1996

Related U.S. Application Data

[63] Continuation of Ser. No. 247,941, May 24, 1994, Pat. No. 5,604,343.
[51] Int. Cl.[6] .................... G06K 19/06; G06K 19/00
[52] U.S. Cl. .................... 235/492; 235/437; 235/382
[58] Field of Search .................. 235/492, 441, 235/385, 487, 382

[56] References Cited

U.S. PATENT DOCUMENTS

| | | | |
|---|---|---|---|
| 5,049,728 | 9/1991 | Rovin | 235/492 |
| 5,166,502 | 11/1992 | Rendleman et al. | 235/492 |
| 5,210,846 | 5/1993 | Lee | 235/492 |
| 5,604,343 | 2/1997 | Curry et al. | 235/492 |

*Primary Examiner*—Donald T. Hajec
*Assistant Examiner*—Thien Minh Le
*Attorney, Agent, or Firm*—Jenkens & Gilchrist, P.C.

[57] ABSTRACT

A secure monetary system comprises an electronic module and equipment to access the electronic module. The electronic module comprising a substantially token-shaped module and secure memory circuitry to store monetary information. The secure memory positioned in the substantially token-shaped module. The equipment accesses and manipulates the monetary information stored in the memory in the electronic module. The equipment comprises memory to store control and encryption programs and the memory is coupled to a microprocessor, which is also coupled to the electronic module and a control panel. The microprocessor is secure.

18 Claims, 4 Drawing Sheets

TRANSACTION SYSTEM AND METHOD

This application is a continuation of application Ser. No. 08/247,941, filed May 24, 1994 now U.S. Pat. No. 5,604,343.

PARTIAL WAIVER OF COPYRIGHT PURSUANT TO 1077 O.G. 22(MAR. 20, 1987)

(C) Copyright, Dallas Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

This application hereby incorporates by reference the following co-assigned issued patents and patent applications, which describe in great detail the operation of the technology surrounding Touch Memory™ processes and systems, which was developed by employees at and/or assigned to Dallas Semiconductor Corporation:

| Serial No./ Patent No. | Filing Date/ Issue Date | DSC Case No. | Authors |
|---|---|---|---|
| 4,862,310 | 04-29-88/08-29-89 | DSC-77 | Harrington |
| 5,210,846 | 05-15-89/05-11-93 | DSC-83 | Lee |
| 08/019,932 | 02-19-93 | DSC-83A | Lee |
| 4,982,371 | 05-15-89/01-01-91 | DSC-85 | Lee et al. |
| 07/632,227 | 12-20-90 | DSC-85A | Lee et al. |
| 5,091,771 | 05-15-89/11-18-91 | DSC-86 | Bolan et al. |
| 4,972,377 | 05-15-89/11-20-90 | DSC-107 | Lee |
| 5,191,554 | 08-27-91/03-02-93 | DSC-107A | Lee |
| 5,181,091 | 09-16-91/01-19-93 | DSC-153A | Harrington et al. |
| 4,945,217 | 05-15-89/07-31-90 | DSC-157 | Bolan |
| 5,025,141 | 07-17-90/06-18-91 | DSC-157A | Bolan |
| 4,948,954 | 05-15-89/08-14-90 | DSC-158 | Dias |
| 4,983,820 | 08-14-90/01-08-91 | DSC-158A | Dias |
| 5,045,675 | 05-15-89/09-03-91 | DSC-159 | Steve Curry |
| 4,995,004 | 05-15-89/02-19-91 | DSC-160 | Lee |
| 07/657,717 | 02-19-91 | DSC-160A | Lee |
| 07/725,793 | 07-09-91 | DSC-175 | Curry et al. |
| 07/998,978 | 12-30-92 | DSC-175A | Curry et al. |
| 07/527,492 | 05-22-90 | DSC-268 | Bolan et al. |
| 5,206,905 | 11-19-90/04-27-93 | DSC-303 | Lee et al. |
| 07/615,615 | 11-19-90 | DSC-304 | Lee et al. |
| 5,226,137 | 11-19-90/07-06-93 | DSC-305 | Lee et al. |
| 07/882,244 | 05-08-92 | DSC-306 | Lee |
| 07/631,929 | 12-19-90 | DSC-316 | Curry et al. |
| 07/728,230 | 07-10-91 | DSC-317 | Pearson et al. |
| 07/727,618 | 07-10-91 | DSC-319 | Williams et al. |
| 07/727,619 | 07-10-91 | DSC-322 | Rodriguez et al. |
| 07/727,638 | 07-10-91 | DSC-324 | Ni et al. |
| 08/103,724 | 08-09-93 | DSC-352 | Pearson et al. |
| 07/727,639 | 07-10-91 | DSC-353 | Bolan et al. |
| 5,166,545 | 07-10-91/11-24-92 | DSC-356 | Harrington |
| 08/022,258 | 02-24-93 | DSC-377 | Bolan et al. |

-continued

| Serial No./ Patent No. | Filing Date/ Issue Date | DSC Case No. | Authors |
|---|---|---|---|
| 08/031,776 | 03-15-93 | DSC-377A | Bolan et al. |
| 08/015,506 | 02/09/93 | DSC-393 | Harrington et al. |
| 08/234,210 | 04/28/94 | DSC-427 | Fekete et al. |

This application also hereby incorporates by reference the following co-assigned issued patents and patent applications, which describe in great detail the operation of the technology surrounding the DS5000 and DS5002 microprocessor processes and systems, which was also developed by employees at and/or assigned to Dallas Semiconductor Corporation:

| Serial No./ Patent No. | Filing Date/ Issue Date | DSC Case No. | Authors |
|---|---|---|---|
| 4,857,767 | 8/15/89 | DSC-59 | Little et al. |
| 5,237,699 | 8/17/93 | DSC-60 | Little et al. |
| 4,908,790 | 3/13/90 | DSC-61 | Little et al. |
| 07/714,973 | 6/13/91 | DSC-63 | Little et al. |
| 4,947,477 | 8/07/90 | DSC-64 | Little et al. |
| 4,890,263 | 12/26/89 | DSC-79 | Little |
| 4,885,716 | 12/05/89 | DSC-79 | Little |
| 07/573,585 | 08/27/90 | DSC-124 | Grider et al. |
| 08/174,584 | 12/28/93 | DSC-124A | Grider et al. |
| 4,168,396 | 09/18/79 | DSC-169 | Best |
| 4,278,837 | 07/14/81 | DSC-170 | Best |
| 4,319,079 | 03/09/82 | DSC-171 | Best |
| 4,433,207 | 02/21/84 | DSC-172 | Best |
| 4,465,901 | 08/14/84 | DSC-173 | Best |

In addition, Applicants also incorporate by reference the data sheet for the DS1982, which is included in the Appendix A, the data sheet for DS5002, which is included in the Appendix B, and the Book of DS199x Touch Memory™ Standards and Book of DS19xx Touch Memory™ Standards, which are both published by and available from Dallas Semiconductor Corporation.

FIELD OF INVENTION

The present invention relates to electronic devices, and, more particularly, to portable semiconductor circuits used to store monetary equivalent data.

BACKGROUND

Numerous examples and applications of monetary equivalent data exist in today's society. For example, the fare payment system used by the Bay Area Rapid Transit (hereafter referred to as "BART") system in San Francisco is an example of an application in which monetary equivalent data is read and written electronically. In this system, the user can obtain a transit ticket and deposit any desired amount of money into it from an automatic vending machine. The information is stored in the ticket magnetically in the form of encoded data written on a magnetic stripe. Each time the user travels from one place to another, the system deducts the fare from the amount represented by the magnetically encoded data, thus, reducing the value of the ticket. When the value of the ticket is nearly exhausted, it can be restored to a high value by inserting it again into an automatic vending machine and depositing additional funds. The BART system eliminates the need for handling money and making change at the point of entry to the transit system, thereby reducing labor costs and increasing efficiency.

A similar advantage can be realized in many other circumstances where an electronically readable and alterable "token" can eliminate the costs and delays associated with money handling at the point of use. Such a token might therefore be used as a meal ticket on a college campus, as a ride ticket at an amusement park, or wherever tickets or tokens are now used to speed monetary payments and/or eliminate unnecessary labor.

The system described above, however, suffers from at least three significant disadvantages. First, paper tickets with magnetic stripes deposited on them are subject to wrinkling or tearing which can cause loss of the monetary equivalent data. Also, the magnetic stripes are subject to erasure by environmental magnetic fields, even if the paper carrier and magnetic material are physically intact. Second, since magnetic recording is a read/write technology, it is possible for a technologically sophisticated person to read the contents of the magnetic stripe when the ticket has a large monetary value, use the ticket until the value is nearly gone, then rewrite the original data into the ticket to restore its original value. It is not necessary for the person to understand the encoding of the monetary data in order to do this. Therefore, the use of a read/write technology makes the tickets vulnerable to counterfeiting. Third, the magnetic recording technology requires uniform motion of the magnetic material across the read/write heads in order to read and write data reliably. This makes it necessary to use a relatively complex mechanical ticket-handling mechanism to read, debit, and rewrite the monetary equivalent data.

SUMMARY OF THE INVENTIONS

A secure monetary system comprises an electronic module and equipment to access the electronic module. The electronic module comprising a substantially token-shaped module and secure memory circuitry to store monetary information. The secure memory positioned in the substantially token-shaped module. The equipment accesses and manipulates the monetary information stored in the memory in the electronic module. The equipment comprises memory to store control and encryption programs and the memory is coupled to a microprocessor, which is also coupled to the electronic module and a control panel. The microprocessor is secure.

The disclosed systems and processes preferably incorporating Add-Only Touch Memory™ technology described above has the following special characteristics which make it uniquely suitable for applications requiring secure crediting, debiting, and portable storage of monetary equivalent data. First, a unique, unalterable registration number which allows the data on each different part to be encrypted differently. This makes it impossible to determine how to counterfeit a part by studying how data is written into a different part. Second, random-access memory which in one-way alterable, that is, having bits that can be changed from a one to a zero but not from a zero back to a one. This makes it impossible to write into a part the data pattern it held earlier when it was more valuable. (This type of memory is commonly referred to as one-time-programmable EPROM, but this terminology is misleading in the current application because it suggests that the part can be written only once.) Third, a small, durable Touch Memory™ package with a simple electrical connection, allowing data to be read or written with a momentary contact.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figure 1:
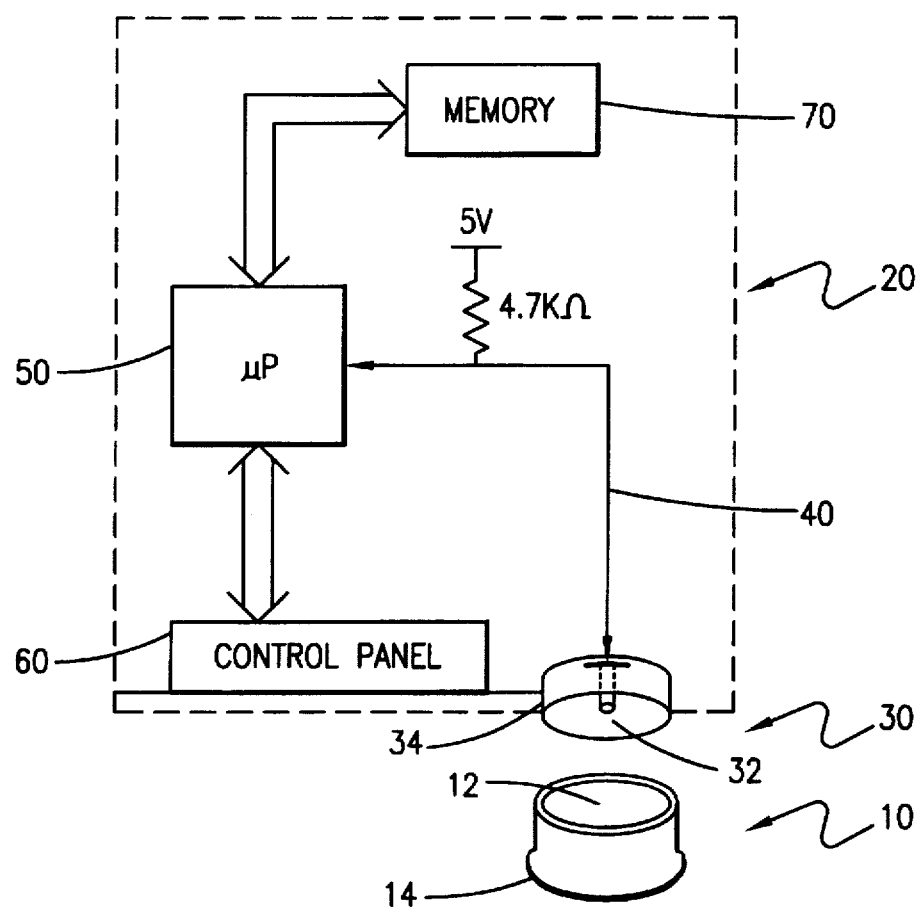
FIG. 1 is an overall block diagram of the preferred architecture of a preferred embodiment of the invention, which generally comprises Add-Only Touch Memory™ electronic module 10, which can be electrically coupled to "tollgate" or "add-fare" equipment 20 (which can exist independently of one another or in a combined piece of equipment)

FIG. 1 is an overall block diagram of the preferred architecture of a preferred embodiment of the invention, which generally comprises Add-Only Touch Memory™ module 10, which can be electrically coupled to "tollgate" or "add-fare" equipment 20 (which can exist independently of one another or in a combined piece of equipment). In general, please note that electronic module 10 houses memory circuitry that stores the monetary information. The monetary information is accessed via probe 30, which transfers information to and from the circuitry in electronic module 10 to microprocessor 50, which, in turn, interprets the information and transfers information to memory 70, control panel 60, and even back to electronic module 10. Memory stores encrypted control and data information in a standard software format understandable and executable by microprocessor 50. Microprocessor 50 is preferably secure. Control panel 60 preferably has a keypad and/or a mechanism to generate information corresponding to money it received and counted (e.g., dollar bills, quarters, etc.), which it transfers to be interpreted by microprocessor 50. Microprocessor 50, memory 70 and control panel 60 are readily available in the marketplace and well understood by those skilled in the art. As described below, however, preferred embodiments do utilize specific microprocessors 50. As explained below, FIG. 1 shows the basic architecture of equipment 20, which may be used to increment and/or decrement electronic module 10, which store the monetary equivalent information.

Electronic modules 10, such as Add-only Touch Memory™ electronic modules, such as the DS1982, are currently manufactured by Dallas Semiconductor Corporation (the data sheet of which is incorporated by reference hereinabove and included in Appendix A hereinbelow) provide a viable alternative technology for the storage of monetary equivalent data which delivers the advantages described above but does not suffer form the disadvantages. As described, inter alia, in U.S. Pat. No. 5,210,846 and related applications (DSC-83); pending patent application having Ser. Nos. 07/725,793 (DSC-175), 08/022,258 (DSC-377), and 08/234,210 (DSC-427), a Touch Memory™ electronic module 10 is comprised of circuitry that is sealed in a durable stainless steel microcan (as shown in FIG. 1 and in the data sheet), which protects it against environmental damage (e.g., bending, wrinkling, getting wet, etc.). Reading and writing data to the circuitry contained in the microcan is accomplished with a momentary contact of the first and second conductive surfaces to a simple electrical probe 30, which is also described, inter alia, in U.S. Pat. No. 5,210,846 and related applications (DSC-83); pending patent application having Ser. Nos. 07/725,793 (DSC-175), and 08/022, 258 (DSC-377) and do not require sophisticated mechanical handling mechanisms. As described in the patents and applications incorporated above, especially pending patent application having Ser. No. 08/234,210 (DSC-427), the stainless steel microcan preferably comprises a first conductive surface 12 and second conductive surface 14 that are electrically isolated from one another. The first conductive surface 12 and the second conductive surface 14 when combined form a cavity to house an integrated circuit mounted on a small printed circuit board. Circuitry embedded in the integrated circuit communicates to the outside world (outside the microcan) via the first and second conductive surfaces 12 and 14. Probe 30 preferably consists of a first conductive contact 32 and second conductive contact 34. The center portion or first conductive contact is preferably connected to a conductive path 40 (e.g., a single wire in preferred embodiments), which is electrically couples the first conductive contact 32 to port pin on microprocessor 50, which executes the necessary protocol to interact with Add-Only Touch Memory™ electronic module 10 via conductive path 40. As shown in FIG. 1, conductive path 40 preferably has a pull-up resistor of 4.7K ohms to a 5 volt supply to boost any signal sent. Second conductive contact 34 is grounded to provide a complete circuit between microprocessor 50 and Add-Only Touch Memory™ electronic module 10 when being accessed (e.g., read or written to). Note that while conductive path 40 is shown independent from control panel 60, it is possible to integrate probe 30 and conductive path 40 into control panel 60. As described in the attached data sheet entitled DS1982, the add-only attribute or feature of Add-only Touch Memory™ electronic module 10 provides protection against counterfeiting, since the data in these memories can never be restored to its original value once it has been modified.

Add-Only Touch Memory™ electronic module 10 contains many bits of information in the circuitry embedded therein, with each bit having either a one or a zero value. Initially, all the bits in the memory are ones. The read/write probe 30, which is described above, can read these bits and transfer this information to microprocessor 50 and it can also selectively change one or more of the bits to zero. Once a bit has been changed to a zero, it cannot be changed back to a one. Writing a bit is therefore much like punching a hole in a meal ticket card. The electrically alterable bits are preferably organized into memory pages having 256 bits each. In addition to these electrically alterable bits, each Touch Memory™ electronic module 10 also contains a unique 64 bit registration number which cannot be altered, which is explained in great detail, inter alia, in pending patent application having Ser. No. 07/725,793 (DSC-175). Dallas Semiconductor Corporation guarantees that no two Touch Memory™ electronic modules 10 ever have the same registration number. Finally, each page has a status register described in the DS1982 data sheet can be read to determine which pages have been used up, and error detection circuitry (hereafter referred to as "CRC") which allows the reader to determine if it has read the data correctly, which is also explained in great detail, inter alia, in pending patent application having Ser. Nos. 07/725,793 (DSC-175) and in the DS1982 datasheet in Appendix A. As a result, with this feature set, preferred system embodiments allow monetary equivalents, which are represented by bit values of 1's and 0's, to be added to or removed from the part many times before it must be replaced, and which is highly resistant to counterfeiting. The basic principle of this system is described below.

The following discussion describes electronic crediting and debiting of Add-Only Touch Memory™ electronic modules 10. A first preferred embodiment implements electronic crediting and debiting of Add-Only Touch Memory™ electronic modules 10 as follows. Monetary units are added by changing one ("1") bits to zero ("0") bits starting from the least significant bit of each page (e.g., PAGES 1–4) of memory in Add-Only Touch Memory™ electronic module 10 and progressing toward to the most significant bit. Similarly, monetary units are debited by changing one bits to zero bits starting from the most significant bit of each page and progressing toward the least significant bit. As the memory in electronic module 10 is repeatedly debited and credited, the rows of zero bits grow toward the middle of the page. When they meet, the page is marked as exhausted with the status byte and the process continues on the next page of memory. (It is possible to ignore pages and treat the entire memory as a single page, but that would require the reading of the entire memory, increasing the time needed to complete a transaction. The electronic read/write process is more efficient when only a portion of the stored data needs to be read.) With this technique, assuming the credit units and debit units have equal value, a 1024 bit memory could credit and debit 512 monetary units before it was used up. If credit units are taken to represent some multiple of the debit unit, then more debits are allowed. (For example, if each credit unit is the equivalent of three debit units, then a 1024 bit memory would allow 768 debits.).

The problem with the first preferred embodiment is that anyone with the necessary knowledge and equipment to read and write data in Add-Only Touch Memory™ electronic module 10 can easily increase the value by adding additional credit units. This is possible because there is a direct, straightforward correspondence between a bit location and its value.

However, if the bits were scrambled (permuted) in an apparently random manner, as implemented in a second preferred embodiment, it would no longer be possible to determine how to add credit units to the memory in Add-Only Touch Memory™ electronic module 10. For example, if 15 bits on a page are still set to one, only one of these bits will add a credit unit to the memory. Similarly, only one of the bits will add a debit unit to the memory. If any one of the other 13 bits were written to zero, it would appear out of sequence and would signify that the memory had been tampered with, thereby invalidating it. Therefore, if a person guesses which bit to write next, he has one chance in 15 of adding a credit unit, one chance in 15 of adding a debit unit (decreasing the value), and 13 chances in 15 of invalidating the memory and flagging it as having been subject to tampering. Although there is a chance of guessing correctly which bit to change, the laws of probability are stacked against this event. For example, this kind of statistical analysis makes lotteries predictable.

Figure 2:
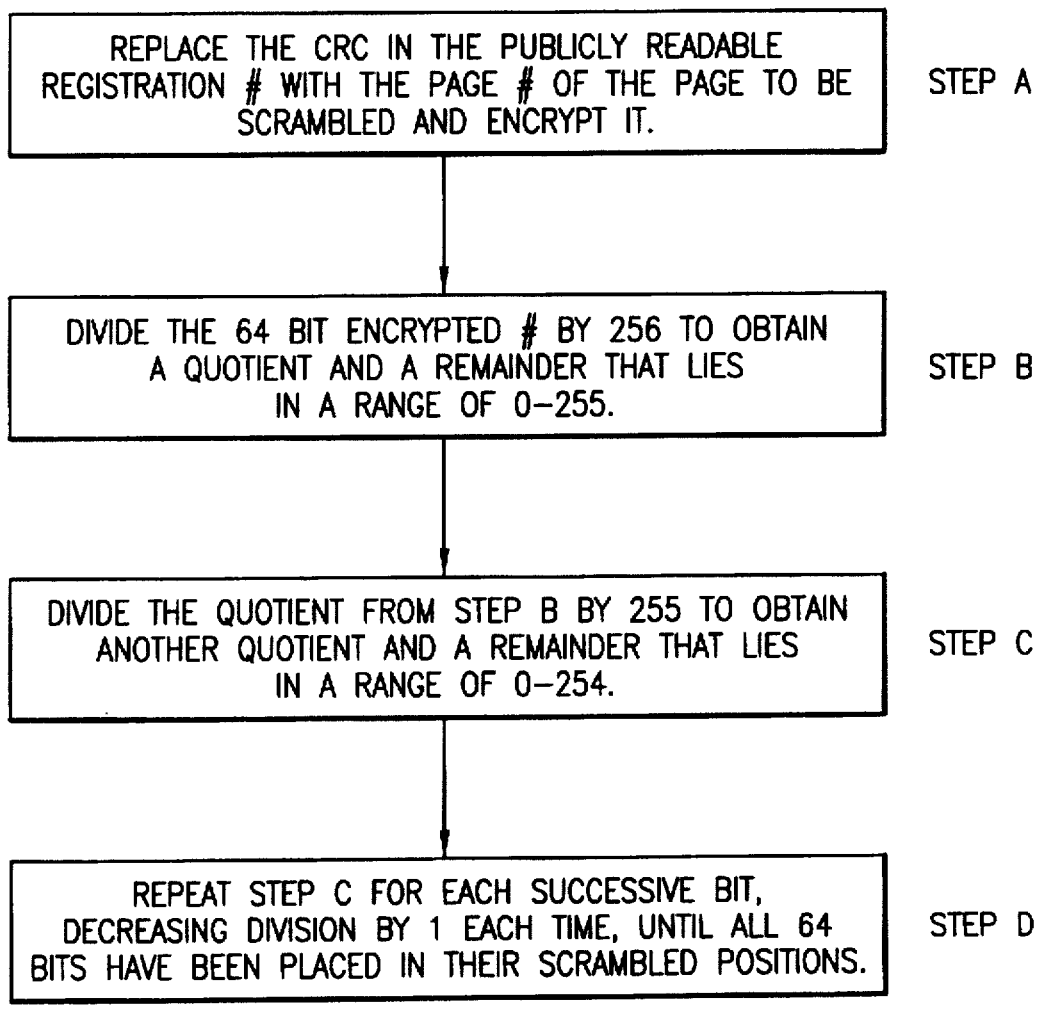
FIG. 2 is a flow chart showing a preferred process to calculate bit permutations from unique registration numbers stored by circuitry in electronic module 10 (in FIG. 1), which is preferably implemented in software stored in memory 70 and executed by microprocessor 50 in equipment 20.

The unique registration number in each Touch Memory™ electronic module 10, as described above, can be used to permute the bits in each part differently, so that one cannot determine by studying the data in one part how to add credit units to a different part. While many different techniques are possible to determine a unique bit permutation from the unique registration number supplied with each part, the preferred techniques are described below. First, the number of different permutations of the 256 bits in each page is very large, approximately ten to the power of 507. Only a minute fraction of these permutations can be enumerated with the unique registration number, since the registration number represents a range of 281 trillion unique numerical values, or about ten to the power of 14. The permutations that can be derived from the unique registration number are thus buried in the much larger population of possible permutations. 281 trillion is in fact an extremely large set of unique registration numbers that is sufficient for all practical purposes. The enormously larger number of different permutations greatly multiplies the task of deducing the permutations from the registration number. To select a permutation based on the registration number from this enormous population, the following method could be used. Referring to FIG. 2, the steps are as follows:

A) replace the CRC in the publicly readable registration number with the page number of the page to be scrambled and then encrypt it with a standard block encryption algorithm (such as the Data Encryption Standard ("DES"), which is well known by those in the art), using a secret encryption key, which produces a 64 bit encrypted number which is unique to each page of each part and is known only to the reader;

B) divide the 64 bit encrypted number by 256 to obtain a quotient and a remainder that lies in the range 0–255—the value of the remainder gives the position of bit 1 in the scrambled data, and leaves 255 other bit positions unfilled;

C) divide the quotient from step B by 255 to obtain another quotient and a remainder that lies in the range 0–254, which the value of this remainder gives the position of bit 2 in the remaining 255 bits that were unfilled after step B; and D) repeat step C for each successive bit, decreasing the divisor by 1 each time, until all 64 bits have been placed in their scrambled positions—each time the quotient reaches zero during this process, replace it with the original encrypted number from step A.

The steps B–D above are numerically intensive and may not be suitable for microcontroller-based equipment. As result, an alternate preferred scrambling technique which could be used by the second preferred embodiment utilizes a simpler but less secure technique is to start with an initial, secret, randomly chosen permutation and then further permute it based on the 64 bit encrypted number by interchanging certain bits or not depending on whether a bit in the encrypted number is a one or a zero. This method provides a simpler set of permutations, but may still provide adequate security in many applications. The complexity of the technique used to derive permutations from the unique registration number can be selected based on the degree of security needed in the application and the amount of computing power available in the equipment.

Figure 3A:
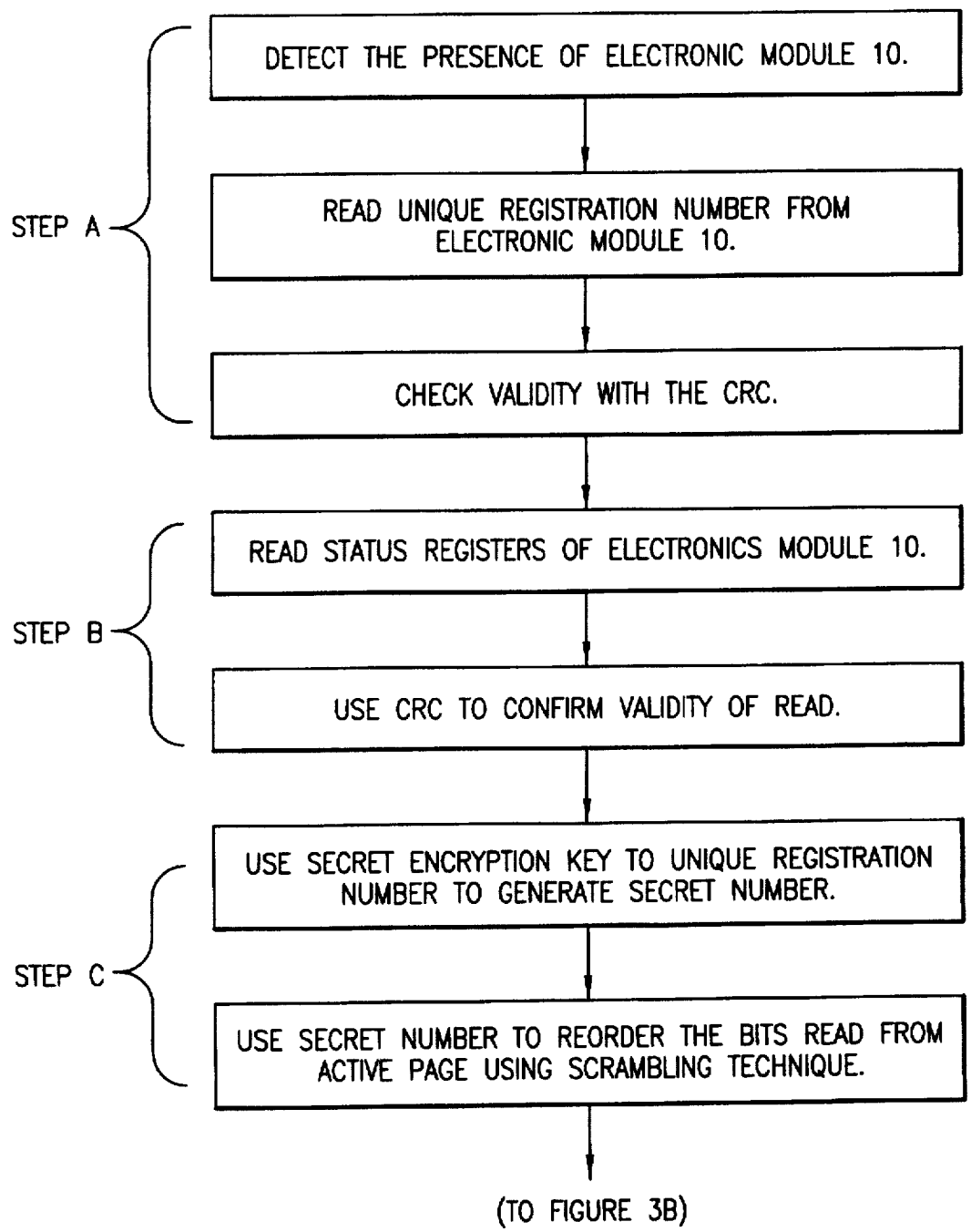
FIGS. 3A and 3B is a flow chart showing a preferred operation used to debit or decrease the value stored in memory in electronic module 10 by one monetary unit, which is preferably implemented in software stored in memory 70 and executed by microprocessor 50 in equipment 20.
Figure 3B:
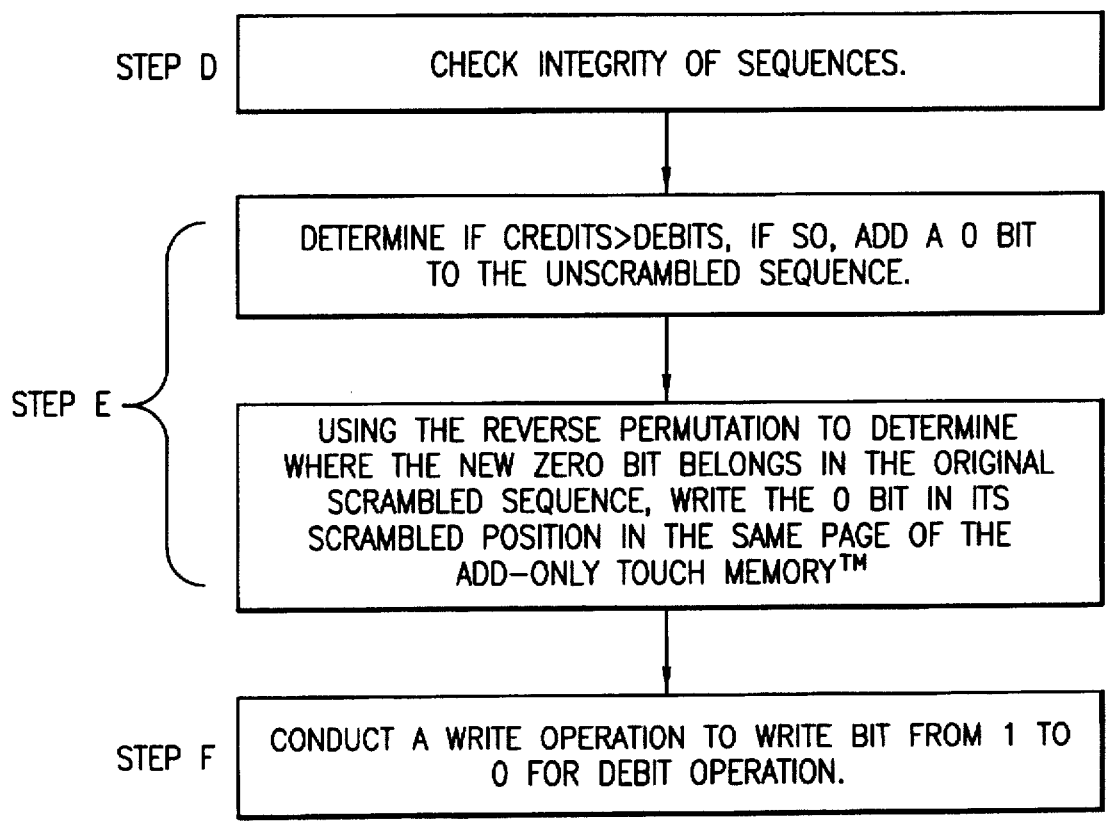

Referring to FIGS. 3A and 3B, regarding a description of the overall operation of the second preferred embodiment, using the scrambling methods and systems described above, the automatic debiting equipment operates as follows to decrease the value of the memory by one monetary unit:

A) the equipment 20 detects the presence of an Add-Only Touch Memory™ electronic module 10 in probe 30 by means of the presence pulse that it generates, reads the unique registration number, and checks its validity with the CRC;

B) the equipment 20 reads the status registers of an Add-Only Touch Memory™ electronic module 10 inserted in probe 30 to find the first page that has not been used up and then reads that page, making use of the built-in CRC calculation circuitry to confirm the validity of the read;

C) using a secret encryption key that can be changed periodically, equipment 20 applies a standard encryption algorithm (such as DES) to the unique registration number (with the CRC replaced with the active page number) to generate a unique secret number, and then uses this number to reorder the bits read from the active page using any of the scrambling techniques described above;

D) after the above reordering, the zero bits starting from the least significant bit represent credits, and the zero bits starting from the most significant bit represent debits (As a result, the monetary data, beginning with the least significant bit, should therefore appear as an unbroken sequence of zero bits (credits), followed by an unbroken sequence of one bits (not yet used), followed by an unbroken sequence of zero or more zero bits (debits). The equipment 20 checks the integrity of these three sequences. If there is a break in any of these sequences or if the number of debits exceeds the number of credits, then there is evidence of tampering and the equipment 20 may take appropriate action (such as recording the registration number, or even sounding an alarm or summoning an official);

E) if the number of credits is greater than the number of debits, the equipment 20 adds one more zero bit to the unscrambled sequence, checks to make sure that the page has not been used up, and then uses the bit permutation in reverse to determine where the debit bit falls in the original scrambled bit sequence (Any time a page is filled, the equipment 20 writes the status bytes to mark the page in memory in electronic module 10 as used up and proceeds to the next page.); and F) the equipment 20 performs a write operation to write the bit identified in step E above from a one to a zero, then reads back the page to make sure that the write operation was completed correctly—when a successful write of the debit bit is detected, the equipment 20 activates a peripheral device (passenger gate, etc.) to signal a completed, successful operation.

The operation of equipment 10 if used to credit is similar to that described above. However, please hot the following differences. The crediting equipment receives cash from the user, which is tabulated by control panel 60 and the information is communicated to microprocessor 50) and sets one or more credit bits to zero to indicate the amount of added value. When a page in memory in electronic module 10 is half full of credit bits, the equipment proceeds to the next page to add additional credits. The bits are written in the scrambled order so that it is impossible to distinguish the credit bits from the debit bits and the bits that have not yet been used.

Both the debiting and crediting equipment can make use of a secure microprocessor 50 (such as the DS5002 secure micro which is manufactured by Dallas Semiconductor Corporation—a data sheet of which is incorporated by reference and shown in Appendix B), so that even if equipment 20 is stolen, misplace, or otherwise removed from a secure location (e.g., an amusement park or bus terminal), it cannot be made to reveal the secret encryption key which is used in step C above. This makes it possible to limit the knowledge of this information to a very small number of individuals. It is important to note that a blank Add-Only Touch Memory™ electronic module 10 has no monetary value until it has been credited with monetary equivalents using its unique bit scrambling algorithm. Therefore, there is no advantage to a counterfeiter to obtain a supply of blank Add-Only Touch Memory™ electronic module 10, and it is unnecessary to take special precautions to safeguard these supplies. While the DS5002 is preferred, Add-Only Touch Memory™ electronic module 10 can provide a one-wire™ interface with a standard port pin of virtually any commercially available microprocessor (e.g. Intel 8051), so that a single wire can be connected between a port pin of a DS5002 used as microprocessor 50 to provide conductive path 40 between microprocessor 50 and Add-Only Touch Memory™ electronic module 10. Alternatively, microprocessor 50 is preferably a rugged, inexpensive, and industrial microprocessor.

Assuming that a high-performance processor is used so that the time required to perform the calculations described above can be neglected, the minimum time required for a debiting transaction is the time required to read the unique registration number, read the status bytes, read the appropriate page, and write out the bit that represents the debit. This time, equal to 31.7 milliseconds, is scarcely perceptible and would be regarded as essentially instantaneous by the user.

Further Modifications and Variations

The preferred embodiments may be modified in many ways while retaining one of more of the features of a the monetary equivalent system. For example, while the scrambling techniques described above are preferably implemented in software stored in memory 70 and executed by microprocessor 50, it is well within the scope of the invention to design a hardware equivalent to execute the same functionality. In addition, while each functional blocks shown in FIG. 1 (microprocessor 50, circuitry driving control panel 60, and memory 70) are preferably integrated in an integrated circuit in a multi-chip embodiment, it is possible that one or more functional blocks could be combined into a single integrated circuit. Similarly, it is not necessary that any of the functional blocks discussed above be implemented in an integrated circuit, except where particular applications demand it (e.g., for speed purposes or size limitations).

Moreover, alternate methods and systems can be used to provide an interface between Add-Only Touch Memory™ electronic module 10 and microprocessor 50. For instance, a three-wire interface could be used. In other words, Add-only Touch Memory™ electronic module 10 can be comprised of more than two conductive surfaces (e.g., three conductive surfaces isolated from one another). Circuitry provided in circuitry embedded in Add-Only Touch Memory™ electronic module 10 exists to provide a three-wire interface. Once again, the potential three wire interface is described in great detail in the patents and patent applications incorporated above. Finally, note that while the mass transit example was used in the background, the application of the inventions described hereinabove are not only limited to mass transit applications. The technology described hereinabove can be used in any application using monetary equivalent data. For instance, but not by way of limitation, applications would include gambling chips, meal tickets, amusement rides, and season tickets to sporting events or concerts, etc.

Attachment A

For instance, start with an initial, secret permutation, and then apply successively a different, additional, secret permutation for each bit of the encrypted number, but only if the bit has a value of one.

*Appendix A*

DS1982

DALLAS
SEMICONDUCTOR

DS1982
1Kbit Add–Only Touch Memory

SPECIAL FEATURES

- 1024–bits Electrically Programmable Read Only Memory (EPROM) communicates with the economy of one signal plus ground
- EPROM partitioned into four 256–bit pages for randomly accessing packetized data records
- Each memory page can be permanently write–protected to prevent tampering
- Device is an "add only" memory where additional data can be programmed into EPROM without disturbing existing data
- Architecture allows software to patch data by superseding an old page in favor of a newly programmed page
- Reduces control, address, data, power, and programming signals to a single data pin
- 8–bit family code specifies DS1982 communications requirements to reader
- Reads over a wide voltage range of 2.8V to 6.0V from –40°C to +85°C; programs at 11.5V ± 0.5V from –40°C to +85°C

COMMON TOUCH MEMORY FEATURES

- Unique, factory–lasered and tested 64–bit registration number (8–bit family code + 48–bit serial number + 8–bit CRC tester) assures absolute traceability because no two parts are alike
- Digital identification and information by momentary contact
- Chip–based data carrier compactly stores information
- Data can be accessed while affixed to object
- Economically communicates to bus master with a single digital signal at 16.3k bits per second
- Standard 16 mm diameter and 1–Wire protocol ensure compatibility with Touch Memory family
- Button shape is self–aligning with cup–shaped probes
- Durable stainless steel case engraved with registration number withstands harsh environments
- Easily affixed with self–stick adhesive backing, latched by its flange, or locked with a ring pressed onto its rim
- Presence detector acknowledges when reader first applies voltage
- Meets UL#913 (4th Edit.): Intrinsically Safe Apparatus, Approved under Entity Concept for use in Class I, Division 1, Group A, B, C and D Locations (application pending)

PIN ASSIGNMENT
F3 PACKAGE

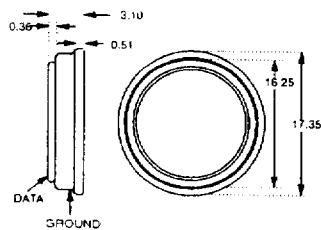

F5 PACKAGE

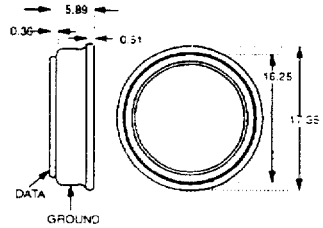

All dimensions shown in millimeters

Copyright © 1993 Dallas Semiconductor Corporation
Printed in U.S.A.

| CONTACTS | |
|---|---|
| Rim | Ground |
| Inner Face | Data |

| ORDERING INFORMATION | |
|---|---|
| DS1982-F3 | F3 package |
| DS1982-F5 | F5 package |

DESCRIPTION

The DS1982 1K-bit EPROM Touch Memory is a rugged read/write data carrier that identifies and stores relevant information about the product or person to which it is attached. This information can be accessed with minimal hardware, for example a single port pin of a microcontroller. The DS1982 consists of a factory-lasered registration number that includes a unique 48-bit serial number, an 8-bit CRC, and an 8-bit Family Code (09h) plus 1K-bit of EPROM which is user-programmable. The power to program and read the DS1982 is derived entirely from the 1-Wire communication line. Data is transferred serially via the 1-Wire protocol which requires only a single data lead and a ground return. The entire device can be programmed and then write-protected if desired. Alternatively, the part may be programmed multiple times with new data being appended to, but not overwriting, existing data with each subsequent programming of the device. Note: Individual bits can be changed only from a logical 1 to a logical 0, never from a logical 0 to a logical 1. A provision is also included for indicating that a certain page or pages of data are no longer valid and have been replaced with new or updated data that is now residing at an alternate page address. This page address redirection allows software to patch data and enhance the flexibility of the device as a standalone database. The 48-bit serial number that is factory-lasered into each DS1982 provides a guaranteed unique identity which allows for absolute traceability. The durable MicroCan package is highly resistant to harsh environments such as dirt, moisture, and shock. Its compact button-shaped profile is self-aligning with cup-shaped receptacles, allowing the DS1982 to be used easily by human operators or automatic equipment. Accessories permit the DS1982 to be mounted on printed circuit boards, plastic key fobs, photo-ID badges, ID bracelets, and many other objects. Applications include work-in-progress tracking, electronic travelers, access control, storage of calibration constants, and debit tokens.

OVERVIEW

The block diagram in Figure 1 shows the relationships between the major control and memory sections of the DS1982. The DS1982 has three main data components: 1) 64-bit lasered ROM, 2) 1024-bit EPROM, and 3) EPROM Status Bytes. The device derives its power for read operations entirely from the 1-Wire communication line by storing energy on an internal capacitor during periods of time when the signal line is high and continues to operate off of this "parasite" power source during the low times of the 1-Wire line until it returns high to replenish the parasite (capacitor) supply. During programming, 1-Wire communication occurs at normal voltage levels and then is pulsed momentarily to the programming voltage to cause the selected EPROM bits to be programmed. The 1-Wire line must be able to provide 12 volts and 10 milliamperes to adequately program the EPROM portions of the part. Whenever programming voltages are present on the 1-Wire line a special high voltage detect circuit within the DS1982 generates an internal logic signal to indicate this condition. The hierarchical structure of the 1-Wire protocol is shown in Figure 2. The bus master must first provide one of the four ROM Function Commands, 1) Read ROM, 2) Match ROM, 3) Search ROM, 4) Skip ROM. These commands operate on the 64-bit lasered ROM portion of each device and can singulate a specific device if many are present on the 1-Wire line as well as indicate to the bus master how many and what types of devices are present. The protocol required for these ROM Function Commands is described in Figure 9. After a ROM Function Command is successfully executed, the memory functions that operate on the EPROM portions of the DS1982 become accessible and the bus master may issue any one of the five Memory Function Commands specific to the DS1982 to read or program the various data fields. The protocol for these Memory Function Commands is described in Figure 6. All data is read and written least significant bit first.

64-BIT LASERED ROM

Each DS1982 contains a unique ROM code that is 64 bits long. The first eight bits are a 1-Wire family code. The next 48 bits are a unique serial number. The last eight bits are a CRC of the first 56 bits. (See Figure 3.) The 64-bit ROM and ROM Function Control section allow the DS1982 to operate as a 1-Wire device and follow the 1-Wire protocol detailed in the section "1-Wire Bus System". The memory functions required to read and program the EPROM sections of the DS1982 are not accessible until the ROM function protocol has been satisfied. This protocol is described in the ROM functions flow chart (Figure 9). The 1-Wire bus master must first provide one of four ROM function commands. 1) Read ROM, 2) Match ROM, 3) Search ROM, or 4) Skip ROM. After a ROM function sequence has been successfully executed, the bus master may then provide any one of the memory function commands specific to the DS1982 (Figure 6).

The 1-Wire CRC of the lasered ROM is generated using the polynomial $X^8 + X^5 + X^4 + 1$. Additional information about the Dallas Semiconductor 1-Wire Cyclic Redundancy Check is available in the Book of DS19xx Touch Memory Standards. The shift register acting as the CRC accumulator is initialized to zero. Then starting with the least significant bit of the family code, one bit at a time is shifted in. After the eighth bit of the family code has been entered, then the serial number is entered. After the 48th bit of the serial number has been entered, the shift register contains the CRC value. Shifting in the eight bits of CRC should return the shift register to all zeroes.

DS1982 BLOCK DIAGRAM Figure 1

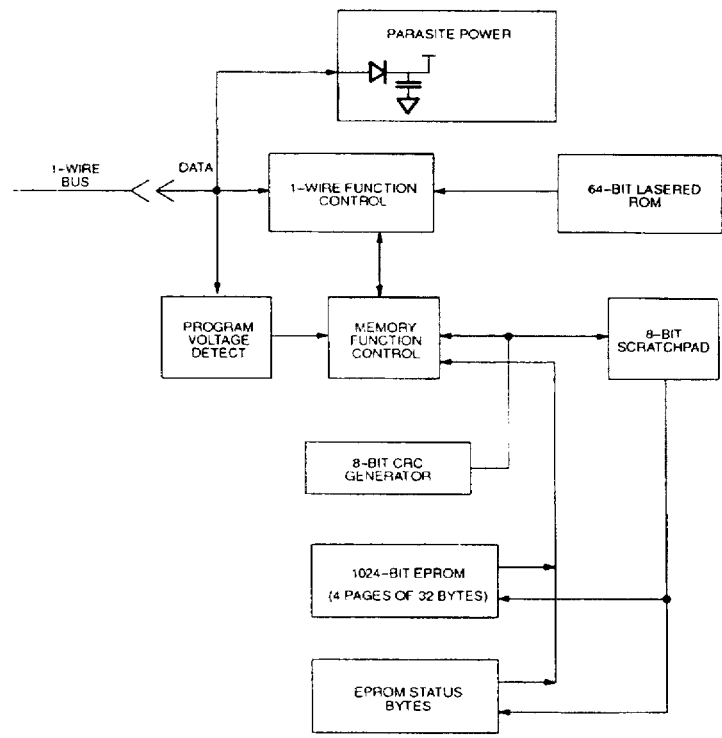

HIERARCHICAL STRUCTURE FOR 1-WIRE PROTOCOL Figure 2
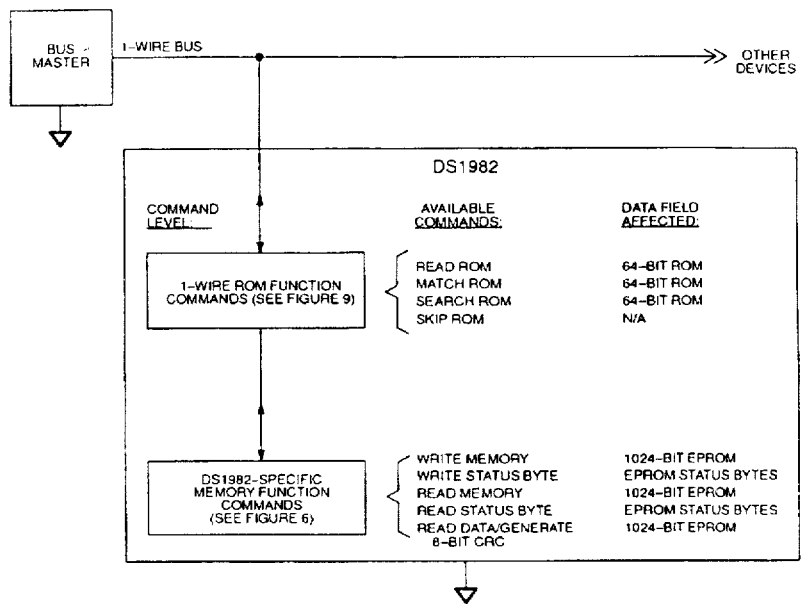
64-BIT LASERED ROM Figure 3
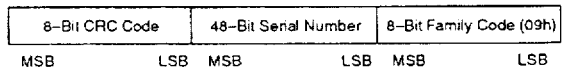
1-WIRE CRC GENERATOR Figure 4
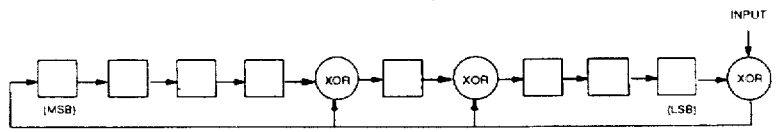

1024-BIT EPROM

The memory map in Figure 5 shows the 1024-bit EPROM section of the DS1982 which is configured as four pages of 32 bytes each. The 8-bit scratchpad is an additional register that acts as a buffer when programming the memory. Data is first written to the scratchpad and then verified by reading an 8-bit CRC from the DS1982 that confirms proper receipt of the data. If the buffer contents are correct, a programming voltage should be applied and the byte of data will be written into the selected address in memory. This process insures data integrity when programming the memory. The details for reading and programming the 1024-bit EPROM portion of the DS1982 are given in the Memory Function Commands section.

EPROM STATUS BYTES

In addition to the 1024 bits of data memory the DS1982 provides 64 bits of Status Memory accessible with separate commands.

The EPROM Status Bytes can be read or programmed to indicate various conditions to the software interrogating the DS1982. The first byte of the EPROM Status Memory contains the Write Protect Page bits which inhibit programming of the corresponding page in the 1024-bit main memory area if the appropriate write protection bit is programmed. Once a bit has been programmed in the Write Protect Page byte, the entire 32 byte page that corresponds to that bit can no longer be altered but may still be read.

The next four bytes of the EPROM Status Memory contain the Page Address Redirection Bytes which indicate if one or more of the pages of data in the 1024-bit EPROM section have been invalidated and redirected to the page address contained in the appropriate redirection byte. The hardware of the DS1982 makes no decisions based on the contents of the Page Address Redirection Bytes. These additional bytes of Status EPROM allow for the redirection of an entire page to another page address, indicating that the data in the original page is no longer considered relevant or valid. With EPROM technology, bits within a page can be changed from a logical 1 to a logical 0 by programming, but cannot be changed back. Therefore, it is not possible to simply rewrite a page if the data requires changing or updating, but with space permitting, an entire page of data can be redirected to another page within the DS1982 by writing the one's complement of the new page address into the Page Address Redirection Byte that corresponds to the original (replaced) page.

This architecture allows the user's software to make a "data patch" to the EPROM by indicating that a particular page or pages should be replaced with those indicated in the Page Address Redirection Bytes.

If a Page Address Redirection Byte has a FFH value, the data in the main memory that corresponds to that page is valid. If a Page Address Redirection Byte has some other hex value, the data in the page corresponding to that redirection byte is invalid, and the valid data can now be found at the one's complement of the page address indicated by the hex value stored in the associated Page Address Redirection Byte. A value of FDH in the redirection byte for page 1, for example, would indicate that the updated data is now in page 2. The details for reading and programming the EPROM status memories portion of the DS1982 is given in the Memory Function Commands section.

MEMORY FUNCTION COMMANDS

The "Memory Function Flow Chart" (Figure 6) describes the protocols necessary for accessing the various data fields within the DS1982. The Memory Function Control section, 8-bit scratchpad, and the Program Voltage Detect circuit combine to interpret the commands issued by the bus master and create the correct control signals within the device. A three-byte protocol is issued by the bus master. It is comprised of a command byte to determine the type of operation and two address bytes to determine the specific starting byte location within a data field. The command byte indicates if the device is to be read or written. Writing data involves not only issuing the correct command sequence but also providing a 12 volt programming voltage at the appropriate times. To execute a write sequence, a byte of data is first loaded into the scratchpad and then programmed into the selected address. Write sequences always occur a byte at a time. To execute a read sequence, the starting address is issued by the bus master and data is read from the part beginning at that initial location and continuing to the end of the selected data field or until a reset sequence is issued. All bits transferred to the DS1982 and received back by the bus master are sent least significant bit first.

DS1982
DS1982 MEMORY MAP Figure 5
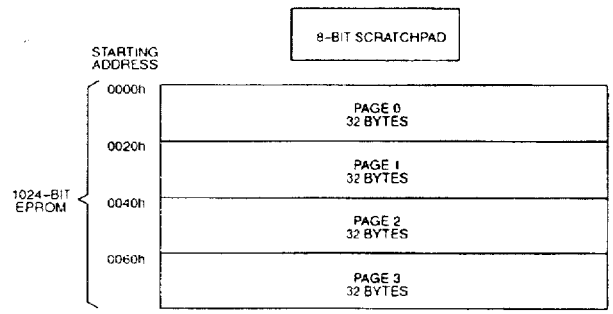
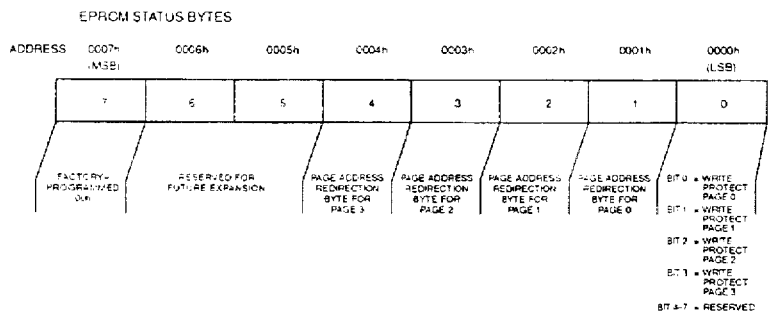

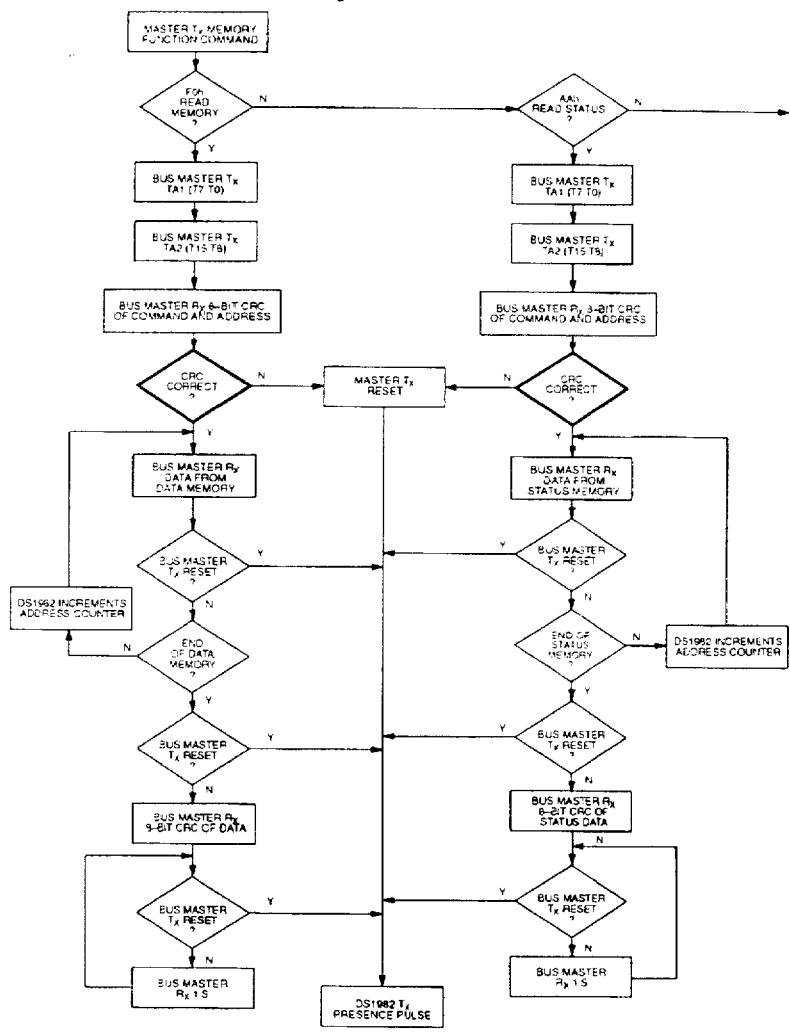
MEMORY FUNCTION FLOW CHART Figure 6

MEMORY FUNCTION FLOW CHART (cont'd) Figure 6
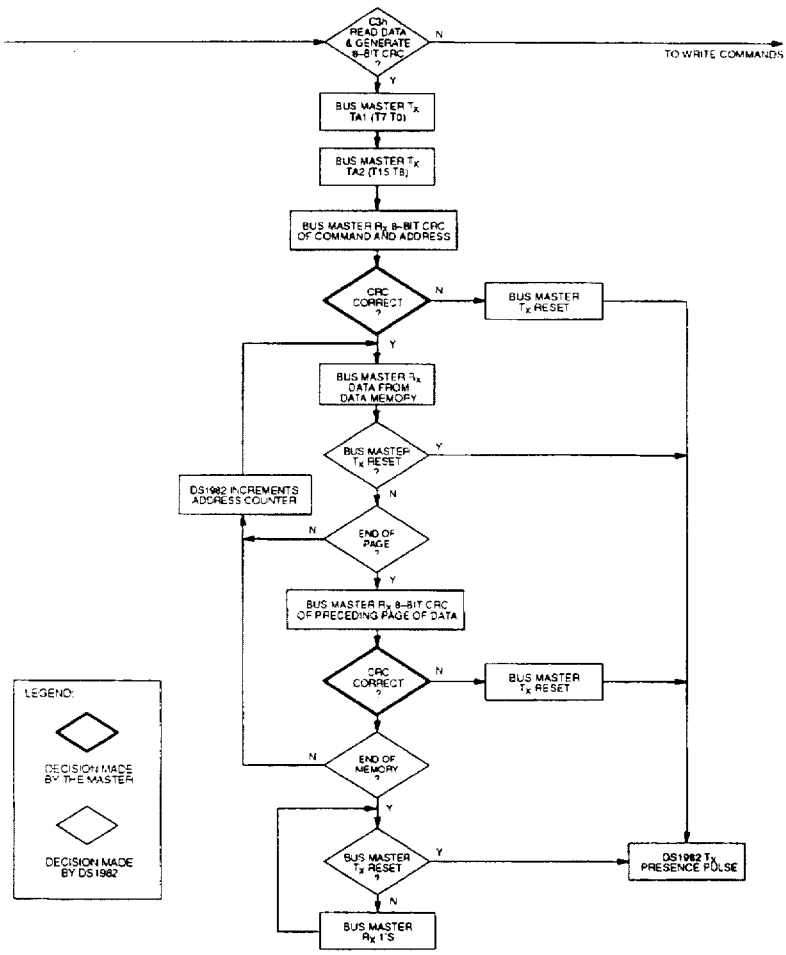

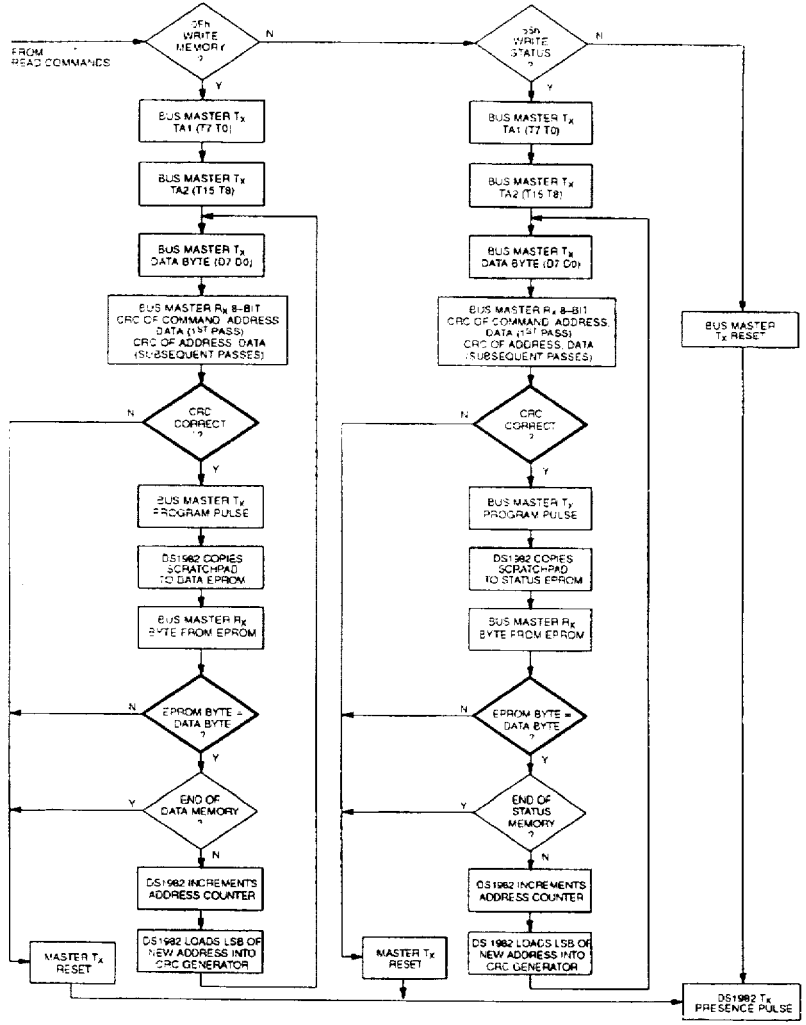

DS1982

READ MEMORY [F0H]
The Read Memory command is used to read data from the 1024-bit EPROM data field. The bus master follows the command byte with a two byte address (TA1=(T7:T0), TA2=(T15:T8)) that indicates a starting byte location within the data field. An 8-bit CRC of the command byte and address bytes is computed by the DS1982 and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the DS1982 starting at the initial address and continuing until the end of the 1024-bit data field is reached or until a Reset Pulse is issued. If reading occurs through the end of memory space, the bus master may issue eight additional read time slots and the DS1982 will respond with an 8-bit CRC of all data bytes read from the initial starting byte through the last byte of memory. After the CRC is received by the bus master, any subsequent read time slots will appear as logical 1s until a Reset Pulse is issued. Any reads ended by a Reset Pulse prior to reaching the end of memory will not have the 8-bit CRC available.

Typically a 16-bit CRC would be stored with each page of data to insure rapid, error-free data transfers that eliminate having to read a page multiple times to determine if the received data is correct or not. (See Book of DS19xx Touch Memory Standards, Chapter 7 for the recommended file structure to be used with the 1-Wire environment.) If CRC values are imbedded within the data, a Reset Pulse may be issued at the end of memory space during a Read Memory command.

READ STATUS [AAH]
The Read Status command is used to read data from the EPROM Status data field. The bus master follows the command byte with a two byte address (TA1=(T7:T0), TA2=(T15:T8)) that indicates a starting byte location within the data field. An 8-bit CRC of the command byte and address bytes is computed by the DS1982 and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the DS1982 starting at the supplied address and continuing until the end of the EPROM Status data field is reached. At that point the bus master will receive an 8-bit CRC that is the result of shifting into the CRC generator all of the data bytes from the initial starting byte through the final factory-programmed byte that contains the 00h value.

This feature is provided since the EPROM Status information may change over time making it impossible to program the data once and include an accompanying CRC that will always be valid. Therefore, the Read Status command supplies an 8-bit CRC that is based on and always is consistent with the current data stored in the EPROM Status data field.

After the 8-bit CRC is read, the bus master will receive logical 1s from the DS1982 until a Reset Pulse is issued. The Read Status command sequence can be exited at any point by issuing a Reset Pulse.

READ DATA/GENERATE 8-BIT CRC [C3H]
The Read Data/Generate 8-bit CRC command is used to read data from the 1024-bit EPROM memory field. The bus master follows the command byte with a two byte address (TA1=(T7:T0), TA2=(T15:T8)) that indicates a starting byte location within the data field. An 8-bit CRC of the command byte and address bytes is computed by the DS1982 and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the DS1982 starting at the initial address and continuing until the end of a 32-byte page is reached. At that point the bus master will send eight additional read time slots and receive an 8-bit CRC that is the result of shifting into the CRC generator all of the data bytes from the initial starting byte to the last byte of the current page. Once the 8-bit CRC has been received, data is again read from the 1024-bit EPROM data field starting at the next page. This sequence will continue until the final page and its accompanying CRC are read by the bus master. Thus each page of data can be considered to be 33 bytes long, the 32 bytes of user-programmed EPROM data and an 8-bit CRC that gets generated automatically at the end of each page.

This type of read differs from the Read Memory command which simply reads each page until the end of address space is reached. The Read Memory command only generates an 8-bit CRC at the end of memory space that often might be ignored, since in many applications the user would store a 16-bit CRC with the data itself in each page of the 1024-bit EPROM data field at the time the page was programmed.

The Read Data/Generate 8-bit CRC command provides an alternate read capability for applications that are "bit-oriented" rather than "page-oriented" where the 1024-bit EPROM information may change over time within a page boundary making it impossible to program the page once and include an accompanying CRC that will always be valid. Therefore, the Read Data/Generate 8-Bit CRC command concludes each page with the DS1982 generating and supplying an 8-bit CRC that is based on and therefore is always consistent with the current data stored in each page of the 1024-bit EPROM data field. After the 8-bit CRC of the last page is read, the bus master will receive logical 1s from the DS1982 until a Reset Pulse is issued. The Read Data/Generate 8-Bit CRC command sequence can be exited at any point by issuing a Reset Pulse.

WRITE MEMORY [0FH]

The Write Memory command is used to program the 1024-bit EPROM data field. The bus master will follow the command byte with a two byte starting address (TA1=(T7:T0), TA2=(T15:T8)) and a byte of data (D7:D0). An 8-bit CRC of the command byte, address bytes, and data byte is computed by the DS1982 and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire bus for 480 μs) is issued by the bus master. Prior to programming, the entire unprogrammed 1024-bit EPROM data field will appear as logical 1s. For each bit in the data byte provided by the bus master that is set to a logical 0, the corresponding bit in the selected byte of the 1024-bit EPROM will be programmed to a logical 0 after the programming pulse has been applied at that byte location.

After the 480 μs programming pulse is applied and the data line returns to a 5 volt level, the bus master issues eight read time slots to verify that the appropriate bits have been programmed. The DS1982 responds with the data from the selected EPROM address sent least significant bit first. This byte contains the logical AND of all bytes written to this EPROM data address. If the EPROM data byte contains 1s in bit positions where the byte issued by the master contains 0s, a Reset Pulse should be issued and the current byte address should be programmed again. If the DS1982 EPROM data byte contains 0s in the same bit positions as the data byte, the programming was successful and the DS1982 will automatically increment its address counter to select the next byte in the 1024-bit EPROM data field. The least significant byte of the new two-byte address will also be loaded into the 8-bit CRC generator as a starting value. The bus master will issue the next byte of data using eight write time slots.

As the DS1982 receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the DS1982 with eight read time slots to confirm that the address incremented properly and the data byte was received correctly. If the CRC is incorrect, a Reset Pulse must be issued and the Write Memory command sequence must be restarted. If the CRC is correct, the bus master will issue a programming pulse and the selected byte in memory will be programmed.

Note that the initial pass through the Write Memory flow chart will generate an 8-bit CRC value that is the result of shifting the command byte into the CRC generator, followed by the two address bytes, and finally the data byte. Subsequent passes through the Write Memory flow chart due to the DS1982 automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the DS1982) is made entirely by the bus master, since the DS1982 will not be able to determine if the 8-bit CRC calculated by the bus master agrees with the 8-bit CRC calculated by the DS1982. If an incorrect CRC is ignored and a program pulse is applied by the bus master, incorrect programming could occur within the DS1982. Also note that the DS1982 will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Memory command, incorrect programming could occur within the DS1982. The Write Memory command sequence can be exited at any point by issuing a Reset Pulse.

WRITE STATUS [55H]

The Write Status command is used to program the EPROM Status data field. The bus master will follow the command byte with a two byte starting address (TA1=(T7:T0), TA2=(T15:T8)) and a byte of status data (D7:D0). An 8-bit CRC of the command byte, address bytes, and data byte is computed by the DS1982 and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire bus for 480 µs) is issued by the bus master. Prior to programming, the first seven bytes of the EPROM Status data field will appear as logical 1s. For each bit in the data byte provided by the bus master that is set to a logical 0, the corresponding bit in the selected byte of the EPROM Status data field will be programmed to a logical 0 after the programming pulse has been applied at that byte location. The eighth byte of the EPROM Status Byte data field is factory-programmed to contain 00h.

After the 480 µs programming pulse is applied and the data line returns to a 5 volt level, the bus master issues eight read time slots to verify that the appropriate bits have been programmed. The DS1982 responds with the data from the selected EPROM Status address sent least significant bit first. This byte contains the logical AND of all bytes written to this EPROM Status Byte address. If the EPROM Status Byte contains 1s in bit positions where the byte issued by the master contained 0s, a Reset Pulse should be issued and the current byte address should be programmed again. If the DS1982 EPROM Status Byte contains 0s in the same bit positions as the data byte, the programming was successful and the DS1982 will automatically increment its address counter to select the next byte in the EPROM Status data field. The least significant byte of the new two-byte address will also be loaded into the 8-bit CRC generator as a starting value. The bus master will issue the next byte of data using eight write time slots.

As the DS1982 receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the DS1982 with eight read time slots to confirm that the address incremented properly and the data byte was received correctly. If the CRC is incorrect, a Reset Pulse must be issued and the Write Status command sequence must be restarted. If the CRC is correct, the bus master will issue a programming pulse and the selected byte in memory will be programmed.

Note that the initial pass through the Write Status flow chart will generate an 8-bit CRC value that is the result of shifting the command byte into the CRC generator, followed by the two address bytes, and finally the data byte. Subsequent passes through the Write Status flow chart due to the DS1982 automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the DS1982) is made entirely by the bus master, since the DS1982 will not be able to determine if the 8-bit CRC calculated by the bus master agrees with the 8-bit CRC calculated by the DS1982. If an incorrect CRC is ignored and a program pulse is applied by the bus master, incorrect programming could occur within the DS1982. Also note that the DS1982 will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Status command, incorrect programming could occur within the DS1982. The Write Status command sequence can be ended at any point by issuing a Reset Pulse.

1-WIRE BUS SYSTEM

The 1-Wire bus is a system which has a single bus master and one or more slaves. In all instances, the DS1982 is a slave device. The bus master is typically a microcontroller. The discussion of this bus system is broken down into three topics: hardware configuration, transaction sequence, and 1-Wire signalling (signal type and timing). A 1-Wire protocol defines bus transactions in terms of the bus state during specified time slots that are initiated on the falling edge of sync pulses from the bus master. For a more detailed protocol description, refer to Chapter 4 of the Book of DS19xx Touch Memory Standards.

Hardware Configuration

The 1-Wire bus has only a single line by definition; it is important that each device on the bus be able to drive it at the appropriate time. To facilitate this, each device attached to the 1-Wire bus must have an open drain connection or 3-state outputs. The DS1982 is an open drain part with an internal circuit equivalent to that shown in Figure 7. The bus master can be the same equivalent circuit. If a bidirectional pin is not available, separate output and input pins can be tied together.

The bus master requires a pull-up resistor at the master end of the bus, with the bus master circuit equivalent to the one shown in Figures 8a and 8b. The value of the pull-up resistor should be approximately 5 k$\Omega$ for short line lengths.

A multidrop bus consists of a 1-Wire bus with multiple slaves attached. The 1-Wire bus has a maximum data rate of 16.3k bits per second. If the bus master is also required to perform programming of the EPROM portions of the DS1982, a programming supply capable of delivering up to 10 milliamps at 12 volts for 480 $\mu$s is required. The idle state for the 1-Wire bus is high. If, for any reason, a transaction needs to be suspended, the bus MUST be left in the idle state if the transaction is to resume. If this does not occur and the bus is left low for more than 120 $\mu$s, one or more of the devices on the bus may be reset.

TRANSACTION SEQUENCE

The sequence for accessing the DS1982 via the 1-Wire port is as follows:

- Initialization
- ROM Function Command
- Memory Function Command
- Read/Write Memory/Status

INITIALIZATION

All transactions on the 1-Wire bus begin with an initialization sequence. The initialization sequence consists of a reset pulse transmitted by the bus master followed by a presence pulse(s) transmitted by the slave(s).

The presence pulse lets the bus master know that the DS1982 is on the bus and is ready to operate. For more details, see the "1-Wire Signalling" section.

ROM FUNCTION COMMANDS

Once the bus master has detected a presence, it can issue one of the four ROM function commands. All ROM function commands are eight bits long. A list of these commands follows (refer to flowchart in Figure 9):

Read ROM [33H]

This command allows the bus master to read the DS1982's 8-bit family code, unique 48-bit serial number, and 8-bit CRC. This command can be used only if there is a single DS1982 on the bus. If more than one slave is present on the bus, a data collision will occur when all slaves try to transmit at the same time (open drain will produce a wired-AND result).

Match ROM [55H]

The match ROM command, followed by a 64-bit ROM sequence, allows the bus master to address a specific DS1982 on a multidrop bus. Only the DS1982 that exactly matches the 64-bit ROM sequence will respond to the subsequent memory function command. All slaves that do not match the 64-bit ROM sequence will wait for a reset pulse. This command can be used with a single or multiple devices on the bus.

DS1982 EQUIVALENT CIRCUIT Figure 7
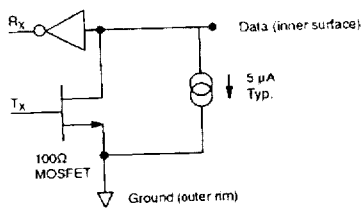
BUS MASTER CIRCUIT Figure 8
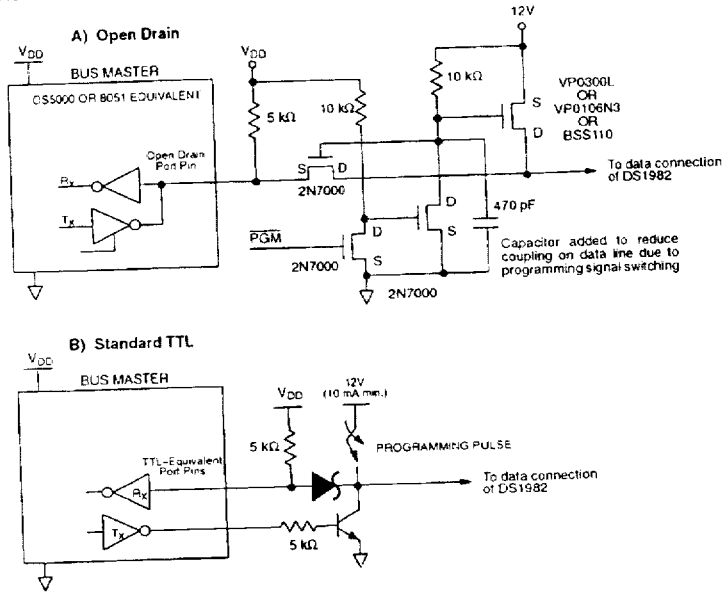

ROM FUNCTIONS FLOW CHART Figure 9
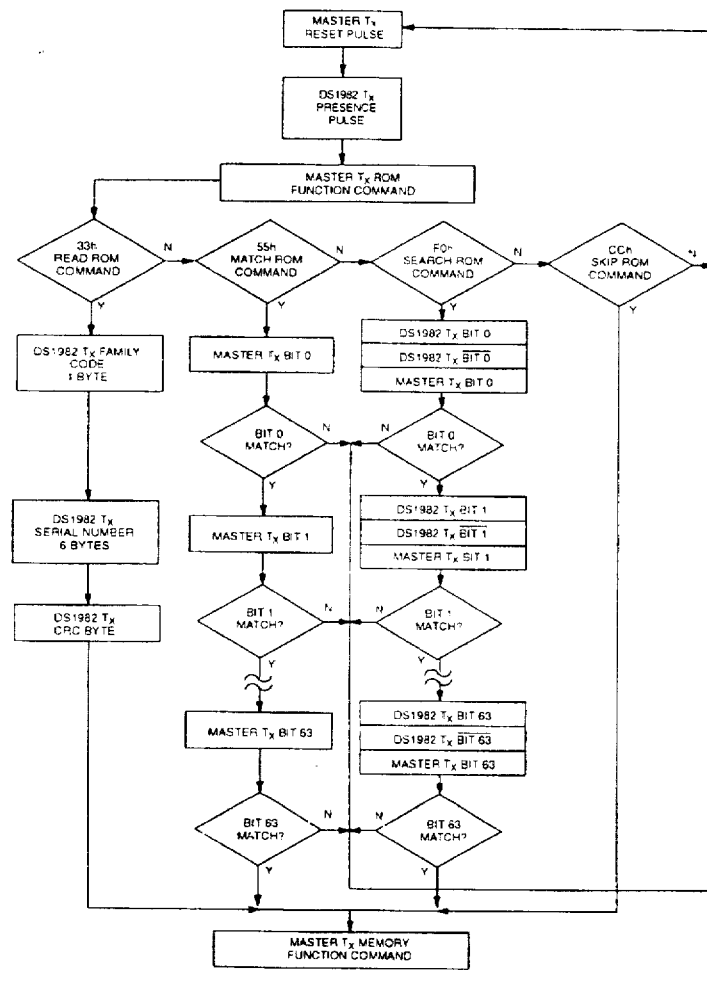
(SEE FIGURE 6)

Skip ROM [CCH]

This command can save time in a single drop bus system by allowing the bus master to access the memory functions without providing the 64-bit ROM code. If more than one slave is present on the bus and a read command is issued following the Skip ROM command, data collision will occur on the bus as multiple slaves transmit simultaneously (open drain pull-downs will produce a wire-AND result).

Search ROM [F0H]

When a system is initially brought up, the bus master might not know the number of devices on the 1-Wire bus or their 64-bit ROM codes. The search ROM command allows the bus master to use a process of elimination to identify the 64-bit ROM codes of all slave devices on the bus. The ROM search process is the repetition of a simple 3-step routine: read a bit, read the complement of the bit, then write the desired value of that bit. The bus master performs this simple, 3-step routine on each bit of the ROM. After one complete pass, the bus master knows the contents of the ROM in one device. The remaining number of devices and their ROM codes may be identified by additional passes. See Chapter 5 of the Book of DS19xx Touch Memory Standards for a comprehensive discussion of a ROM search, including an actual example.

1-Wire Signalling

The DS1982 requires strict protocols to insure data integrity. The protocol consists of five types of signalling on one line: Reset Sequence with Reset Pulse and Presence Pulse, Write 0, Write 1, Read Data and Program Pulse. All these signals except presence pulse are initiated by the bus master. The initialization sequence required to begin any communication with the DS1982 is shown in Figure 10. A reset pulse followed by a presence pulse indicates the DS1982 is ready to accept a ROM command. The bus master transmits (TX) a reset pulse ($t_{RSTL}$, minimum 480 μs). The bus master then releases the line and goes into receive mode (RX). The 1-Wire bus is pulled to a high state via the pull-up resistor. After detecting the rising edge on the 1-Wire line, the DS1982 waits ($t_{PDH}$, 15-60 μs) and then transmits the presence pulse ($t_{PDL}$, 60-240 μs).

Read/Write Time Slots

The definitions of write and read time slots are illustrated in Figure 11. All time slots are initiated by the master driving the data line low. The falling edge of the data line synchronizes the DS1982 to the master by triggering a delay circuit in the DS1982. During write time slots, the delay circuit determines when the DS1982 will sample the data line. For a read data time slot, if a "0" is to be transmitted, the delay circuit determines how long the DS1982 will hold the data line low overriding the 1 generated by the master. If the data bit is a "1", the Touch Memory will leave the read data time slot unchanged

PROGRAM PULSE

To copy data from the 8-bit scratchpad to the EPROM Data or Status Memory, a program pulse of 12 volts is applied to the data line after the bus master has confirmed that the CRC for the current byte is correct. During programming, the bus master controls the transition from a state where the data line is idling high via the pull-up resistor to a state where the data line is actively driven to a programming voltage of 12 volts providing a minimum of 10 mA of current to the DS1982. This programming voltage (Figure 12) should be applied for 480 μs, after which the bus master returns the data line to an idle high state controlled by the pull-up resistor. Note that due to the high voltage programming requirements for any 1-Wire EPROM device, it is not possible to multi-drop non-EPROM based 1-Wire devices with the DS1982 during programming. An internal diode within the non-EPROM based 1-Wire devices will attempt to clamp the data line at approximately 8 volts and could potentially damage these devices.

CRC GENERATION

The DS1982 has an 8-bit CRC stored in the most significant byte of the 64-bit ROM. The bus master can compute a CRC value from the first 56 bits of the 64-bit ROM and compare it to the value stored within the DS1982 to determine if the ROM data has been received error-free by the bus master. The equivalent polynomial function of this CRC is: $X^8 + X^5 + X^4 + 1$.

Under certain conditions, the DS1982 also generates an 8-bit CRC value using the same polynomial function shown above and provides this value to the bus master to validate the transfer of command, address, and data bytes from the bus master to the DS1982. The Memory Function Flow Chart of Figure 6 indicates that the DS1982 computes an 8-bit CRC for the command, address, and data bytes received for the Write Memory and the Write Status commands and then outputs this value to the bus master to confirm proper transfer. Similarly the DS1982 computes an 8-bit CRC for the command and address bytes received from the bus master for the Read Memory, Read Status, and Read Data/Generate 8-Bit CRC commands to confirm that these bytes have been received correctly. The CRC generator on the DS1982 is also used to provide verification of error-free data transfer as each page of data from the 1024-bit EPROM is sent to the bus master during a Read Data/Generate 8-Bit CRC command, and for the eight bytes of information in the status memory field.

In each case where a CRC is used for data transfer validation, the bus master must calculate a CRC value using the polynomial function given above and compare the calculated value to either the 8-bit CRC value stored in the 64-bit ROM portion of the DS1982 (for ROM reads) or the 8-bit CRC value computed within the DS1982. The comparison of CRC values and decision to continue with an operation are determined entirely by the bus master. There is no circuitry on the DS1982 that prevents a command sequence from proceeding if the CRC stored in or calculated by the DS1982 does not match the value generated by the bus master. Proper use of the CRC as outlined in the flow chart of Figure 6 can result in a communication channel with a very high level of integrity. For more details on generating CRC values including example implementations in both hardware and software, see the Book of DS19xx Touch Memory Standards.

INITIALIZATION PROCEDURE "RESET AND PRESENCE PULSES" Figure 10

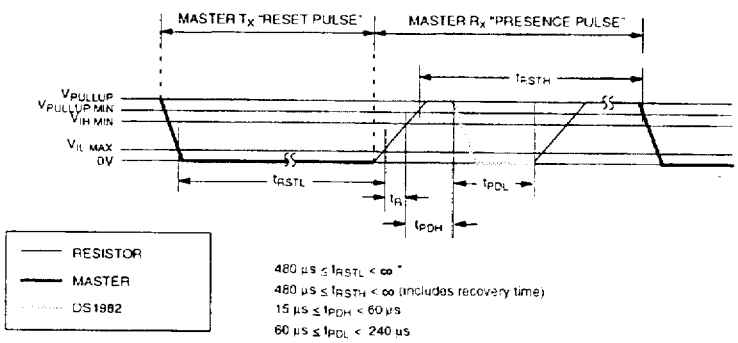

$480\ \mu s \leq t_{RSTL} < \infty$ *
$480\ \mu s \leq t_{RSTH} < \infty$ (includes recovery time)
$15\ \mu s \leq t_{PDH} < 60\ \mu s$
$60\ \mu s \leq t_{PDL} < 240\ \mu s$

* In order not to mask interrupt signalling by other devices on the 1-Wire bus, $t_{RSTL} + t_R$ should always be less than 960 μs.

DS1982
READ/WRITE TIMING DIAGRAM Figure 11
Write–one Time Slot
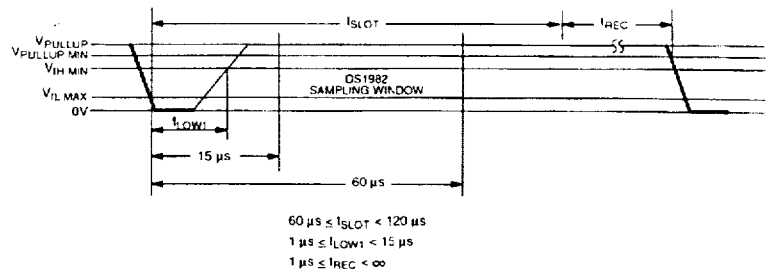
$60 \mu s \leq t_{SLOT} < 120 \mu s$
$1 \mu s \leq t_{LOW1} < 15 \mu s$
$1 \mu s \leq t_{REC} < \infty$
Write–zero Time Slot
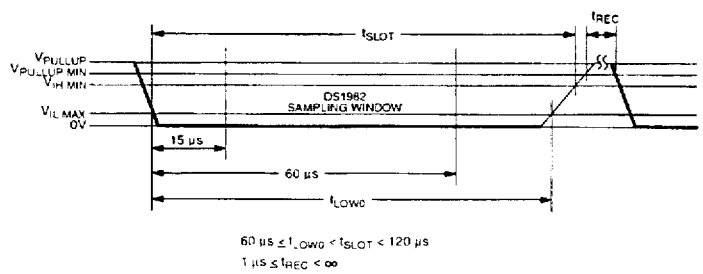
$60 \mu s \leq t_{LOW0} < t_{SLOT} < 120 \mu s$
$1 \mu s \leq t_{REC} < \infty$
Read–data Time Slot
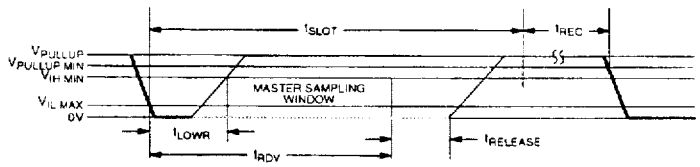
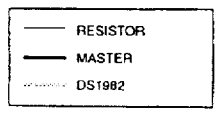
$60 \mu s \leq t_{SLOT} < 120 \mu s$
$1 \mu s \leq t_{LOWR} < 15 \mu s$
$0 \leq t_{RELEASE} < 45 \mu s$
$1 \mu s \leq t_{REC} < \infty$
$t_{RDV} = 15 \mu s$

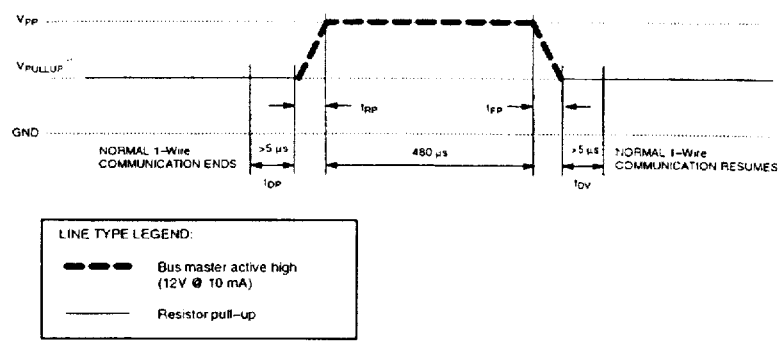
PROGRAM PULSE TIMING DIAGRAM Figure 12

DS1982

ABSOLUTE MAXIMUM RATINGS\*
Voltage on any Pin Relative to Ground     -0.5V to +12.0V
Operating Temperature     -40°C to +85°C
Storage Temperature     -55°C to +125°C \* This is a stress rating only and functional operation of the device at these or any other conditions outside those indicated in the operation sections of this specification is not implied. Exposure to absolute maximum rating conditions for extended periods of time may affect reliability.

DC ELECTRICAL CHARACTERISTICS     ($V_{PUP}$=2.8V to 6.0V; -40°C to +85°C)

| PARAMETER | SYMBOL | MIN | TYP | MAX | UNITS | NOTES |
|---|---|---|---|---|---|---|
| Logic 1 | $V_{IH}$ | 2.2 | | $V_{CC}$+0.3 | V | 1, 6 |
| Logic 0 | $V_{IL}$ | -0.3 | | +0.8 | V | 1 |
| Output Logic Low @ 4 mA | $V_{OL}$ | | | 0.4 | V | 1 |
| Output Logic High | $V_{OH}$ | | $V_{PUP}$ | 6.0 | V | 1, 2 |
| Input Load Current | $I_L$ | | 5 | | µA | 3 |
| Operating Charge | $Q_{OP}$ | | | 30 | nC | 7, 8 |
| Programming Voltage @ 10 mA | $V_{PP}$ | 11.0 | 11.5 | 12.0 | V | |

CAPACITANCE     ($t_A$ = 25°C)

| PARAMETER | SYMBOL | MIN | TYP | MAX | UNITS | NOTES |
|---|---|---|---|---|---|---|
| Data (1-Wire) | $C_{IN/OUT}$ | | | 800 | pF | 9 |

AC ELECTRICAL CHARACTERISTICS     ($V_{PUP}$=2.8V to 6.0V; -40°C to +85°C)

| PARAMETER | SYMBOL | MIN | TYP | MAX | UNITS | NOTES |
|---|---|---|---|---|---|---|
| Time Slot | $t_{SLOT}$ | 60 | | 120 | µs | |
| Write 1 Low Time | $t_{LOW1}$ | 1 | | 15 | µs | |
| Write 0 Low Time | $t_{LOW0}$ | 60 | | 120 | µs | |
| Read Data Valid | $t_{RDV}$ | | exactly 15 | | µs | |
| Release Time | $t_{RELEASE}$ | 0 | 15 | 45 | µs | |
| Read Data Setup | $t_{SU}$ | | | 1 | µs | 5 |
| Recovery Time | $t_{REC}$ | 1 | | | µs | |
| Reset Time High | $t_{RSTH}$ | 480 | | | µs | 4 |
| Reset Time Low | $t_{RSTL}$ | 480 | | | µs | |
| Presence Detect High | $t_{PDHIGH}$ | 15 | | 60 | µs | |
| Presence Detect Low | $t_{PDLOW}$ | 60 | | 240 | µs | |
| Delay to Program | $t_{DP}$ | 5 | | | µs | 10 |
| Delay to Verify | $t_{DV}$ | 5 | | | µs | 10 |
| Program Pulse Width | $t_{PP}$ | 480 | | | µs | 10 |
| Program Voltage Rise Time | $t_{RP}$ | 5 | | | µs | 10 |
| Program Voltage Fall Time | $t_{FP}$ | 5 | | | µs | 10 |

NOTES:

1. All voltages are referenced to ground.
2. $V_{PUP}$ = external pull-up voltage.
3. Input load is to ground.
4. An additional reset or communication sequence cannot begin until the reset high time has expired.
5. Read data setup time refers to the time the host must pull the 1-Wire bus low to read a bit. Data is guaranteed to be valid within 1 μs of this falling edge and will remain valid for 14 μs minimum. (15 μs total from falling edge on 1-Wire bus.)
6. $V_{IH}$ is a function of the external pull-up resistor and the $V_{CC}$ supply.
7. 30 nanocoulombs per 72 time slots @ 5.0V.
8. At $V_{CC}$=5.0V with a 5 kΩ pullup to $V_{CC}$ and a maximum time slot of 120 μs.
9. Capacitance on the data pin could be 800 pF when power is first applied. If a 5 kΩ resistor is used to pull up the data line to $V_{CC}$, 5 μs after power has been applied the parasite capacitance will not affect normal communications.
10. Maximum 1-Wire voltage for programming parameters is 11.5V ± 0.5V; temperature range is –40°C to +85°C.

*Appendix D*

DALLAS SEMICONDUCTOR

FULL DATA SHEET AVAILABLE — CALL 214-450-3836

DS5002FP
Secure Micro Chip

FEATURES

- Enhanced security features:
  - Stronger address/data encryptor
  - 64-bit encryption key word
  - Automatic true random key generation
  - SDI (Self-Destruct Input)
  - Top coating defeats microprobe attack
- Customer-specific encryption versions available
- Incorporates enhanced memory and I/O features of DS5001FP 128K Micro Chip.
- 100% compatible with 8051 instruction set
- 80-pin Quad Flat Pack (QFP) surface-mount package

PACKAGE OUTLINE

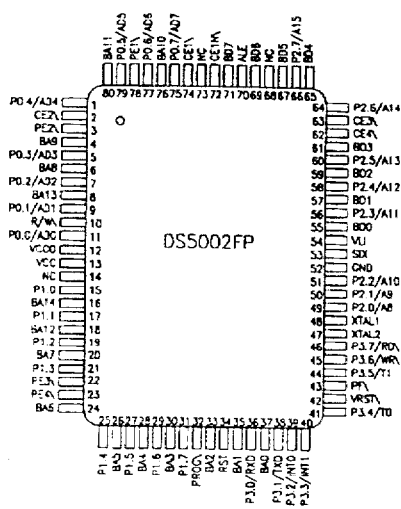

DESCRIPTION

The DS5002FP Secure Micro Chip is a secure version of the DS5001FP 128K Micro Chip. In addition to the memory and I/O enhancements of the DS5001FP, the Secure Micro Chip incorporates the most sophisticated security features available in any microcontroller. The security features of the DS5002FP include an array of mechanisms which are designed to resist all levels of threat, including observation, analysis, and physical attack. As a result, a massive effort would be required to obtain any information about memory contents. Furthermore, the soft nature of the DS5002FP allows frequent modification of the secure information, thereby minimizing the value of any secure information obtained at any given time by such a massive effort.

The DS5002FP implements a security system that is an improved version of its predecessor, the DS5000 Soft Microcontroller. Like the DS5000, the DS5002FP loads and executes application software in encrypted form in up to 128K x 8 bytes of standard SRAM on its bytewide bus. This RAM is converted by the DS5002FP into lithium-backed nonvolatile storage for programs and data. As a result, the contents of the RAM and the execution of the software appear unintelligible to the outside observer. The encryption algorithm uses an internally stored and protected key. Any attempt to discover the key value results in its erasure, rendering the encrypted contents of the RAM useless.

The Secure Micro Chip offers a number of major enhancements to the software security implemented in the previous generation of the DS5000 Soft Microcontroller. A full data sheet is available under non-disclosure agreement. Contact the factory for details.

We claim:

1. A transaction system, comprising:
   (a) means for storing value information;
   (b) means for manipulating said value information; and
   (c) means for interfacing said value information storing means with said manipulating means, wherein said value information storing means comprises:
   (a1) an electronic data module with a first conductive surface and a second conductive surface, said first and second conductive surfaces being electrically isolated from each other by an insulator and forming a cavity;
   (a2) electronic circuitry disposed within said cavity, said electronic circuitry including a plurality of one-way alterable memory locations, each of said plurality of one-way alterable memory locations representing a unit of said value information.

2. A transaction system, comprising:
   (a) means for storing value information;
   (b) means for manipulating said value information; and
   (c) means for interfacing, said value information storing means with said manipulating means, wherein said interfacing means comprises a probe having a first and a second conductive contact, said probe being electrically connectable to said manipulating means, further wherein said first conductive contact of said probe is a single wire axially disposed within an enclosure formed by said second conductive contact of said probe.

3. A method for effectuating a transaction operation in an electronic transaction system, which system is of the type including a point-of-use terminal and an electronic data module having a plurality of one-way alterable memory locations, comprising the steps of:
   (a) crediting a first amount of value to said electronic data module by altering a first sub-plurality of said one-way alterable memory locations, starting from the least significant location of said plurality of one-way alterable memory locations;
   (b) presenting said electronic data module to said point-of-use terminal for obtaining at least one of a service or a good;
   (c) dispensing said at least one of a service or a good if said first amount of value of value is greater than or equal to a pre-determined value corresponding to said at least one of a service or a good; and
   (e) debiting a second amount of value from said electronic data module, said second amount of value corresponding to said pre-determined value, said debiting being performed by altering a second sub-plurality of said one-way alterable memory locations, starting from the most significant location of said plurality of one-way alterable memory locations.

4. The method as recited in claim 3, wherein said crediting step further comprises encrypting said first sub-plurality of said one-way alterable memory locations.

5. The method as recited in claim 3, wherein said debiting step further comprises encrypting said second sub-plurality of said one-way alterable memory locations.

6. A transaction system comprising:
   a point-of-use terminal for effectuating a transaction, said transaction comprising dispensing at least one of a service or a good; and
   an electronic data module having storage means for storing value information, said storage means including a plurality of one-way alterable memory locations,
   wherein when said electronic data module is presented to said point-of-use terminal for effectuating said transaction, said value information is debited after successfully completing said transaction by altering a sub-group of said plurality of one-way alterable memory locations, starting from the most significant location of said plurality of one-way alterable memory locations.

7. The transaction system as recited in claim 6, wherein said service comprises dispensing a postage stamp.

8. The transaction system as recited in claim 6, wherein said service comprises dispensing a fare ticket for travel.

9. The transaction system as recited in claim 6, wherein said service comprises dispensing a ride ticket at an amusement park.

10. The transaction system as recited in claim 6, wherein said service comprises dispensing a meal ticket at an eatery.

11. The transaction system as recited in claim 6, wherein said point-of-use terminal comprises:
    a probe for receiving and interfacing with said electronic data module; and
    means for manipulating value information received from said electronic data module, said means being operably coupled to said probe.

12. The transaction system as recited in claim 11, wherein said manipulating means further comprises means for encrypting said sub-group of said plurality of one-way alterable memory locations.

13. A transaction system comprising:
    a point-of-use terminal for effectuating a transaction; and
    an electronic data module having storage means for monetary equivalent data, said storage means including a plurality of one-way alterable memory locations, each of said plurality of one-way alterable memory locations representing a pre-determined unit of said monetary equivalent data,
    wherein when said electronic data module is presented to said point-of-use terminal for effectuating said transaction, said transaction comprises at least one of incrementing said monetary equivalent data upon presenting money to said point-of-use terminal and decrementing said monetary equivalent data upon successfully receiving at least one of a good or a service from said point-of-use terminal.

14. The transaction system as recited in claim 13, wherein said incrementing comprises altering a first sub-group of said plurality of one-way alterable memory locations, starting from the least significant memory location.

15. The transaction system as recited in claim 14, wherein said decrementing comprises altering a second sub-group of said plurality of one-way alterable memory locations, starting from the most significant memory location.

16. The transaction system as recited in claim 15, wherein said first sub-group of said plurality of one-way alterable memory locations is encrypted.

17. The transaction system as recited in claim 15, wherein said second sub-group of said plurality of one-way alterable memory locations is encrypted.

18. The transaction system as recited in 13, wherein said point-of-use terminal comprises:
    a probe for receiving and interfacing with said electronic data module; and
    means for manipulating said monetary equivalent data received from said electronic data module, said means being operably coupled to said probe.

* * * * *